(12) United States Patent
Farouz-Fouquet

(10) Patent No.: US 10,882,636 B2
(45) Date of Patent: Jan. 5, 2021

(54) WING COMPRISING A LEADING EDGE HAVING MEANS FOR PREVENTING THE CLOGGING OF HOLES PRODUCED IN THE LEADING EDGE

(71) Applicant: Airbus Operations SAS, Toulouse (FR)

(72) Inventor: Mathias Farouz-Fouquet, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 304 days.

(21) Appl. No.: 16/133,119

(22) Filed: Sep. 17, 2018

(65) Prior Publication Data
US 2019/0084692 A1 Mar. 21, 2019

(30) Foreign Application Priority Data
Sep. 15, 2017 (FR) .................... 17 58563

(51) Int. Cl.
*B64D 47/00* (2006.01)
*B64C 21/04* (2006.01)
(Continued)

(52) U.S. Cl.
CPC ............ *B64D 47/00* (2013.01); *B08B 7/0035* (2013.01); *B64C 21/02* (2013.01); *B64C 21/04* (2013.01);
(Continued)

(58) Field of Classification Search
CPC ....... B64C 21/08; B64C 23/005; B64C 21/04; B64C 23/06; B64C 2230/04;
(Continued)

(56) References Cited

U.S. PATENT DOCUMENTS 3,521,837 A 7/1970 Papst
2004/0195462 A1* 10/2004 Malmuth ................ B64C 21/00
244/205
(Continued)

FOREIGN PATENT DOCUMENTS

EP 2913266 A1 9/2015
WO 2016062645 A1 4/2016

OTHER PUBLICATIONS

French Search Report; priority document.

*Primary Examiner* — Joshua J Michener
*Assistant Examiner* — Cindi M Curry
(74) *Attorney, Agent, or Firm* — Greer, Burns & Crain, Ltd.

(57) ABSTRACT

A wing comprising a leading edge forming a caisson delimited by a wall and an electrically conductive skin forming a lower surface and an upper surface and pierced with holes. A pump is provided to suck the air present in the caisson and/or to inject air into the caisson. The wing includes a voltage generator. Each hole is equipped with an anti-clogging system which comprises an electrically conductive electrode, an electrically insulating body having a stem which lodges in the hole and which has a central orifice in which the electrode lodges. The outer face of the stem has at least one tooth, where each tooth protrudes from the outer face of the stem and extends over the height of the stem. The at least one tooth is distributed around the stem so as to create at least one channel.

8 Claims, 3 Drawing Sheets

(51) Int. Cl.
  *H05H 1/24*   (2006.01)
  *B08B 7/00*   (2006.01)
  *B64C 21/06*  (2006.01)
  *B64C 21/02*  (2006.01)
  *F04D 29/68*  (2006.01)
  *B64D 15/02*  (2006.01)
  *B64D 33/02*  (2006.01)

(52) U.S. Cl.
  CPC .............. *B64C 21/06* (2013.01); *B64D 15/02* (2013.01); *F04D 29/681* (2013.01); *H05H 1/24* (2013.01); *B64C 2230/00* (2013.01); *B64C 2230/04* (2013.01); *B64D 2033/022* (2013.01); *B64D 2033/0226* (2013.01); *H05H 1/2406* (2013.01)

(58) Field of Classification Search
  CPC ............ B64C 2230/06; B64C 2230/12; B64C 2230/22; B64D 15/00; F15D 1/0065; F15D 1/0055; F15D 1/0075
  See application file for complete search history.

(56) References Cited

U.S. PATENT DOCUMENTS

| | | |
|---|---|---|
| 2007/0221788 A1 | 9/2007 | Meister |
| 2015/0239552 A1 | 8/2015 | Dejan |
| 2016/0107203 A1 | 4/2016 | Nikic |
| 2017/0217569 A1 | 8/2017 | Gueuning et al. |

\* cited by examiner

WING COMPRISING A LEADING EDGE HAVING MEANS FOR PREVENTING THE CLOGGING OF HOLES PRODUCED IN THE LEADING EDGE

CROSS-REFERENCES TO RELATED APPLICATIONS

This application claims the benefit of the French patent application No. 1758563 filed on Sep. 15, 2017, the entire disclosures of which are incorporated herein by way of reference.

BACKGROUND OF THE INVENTION

The present invention relates to a wing comprising a leading edge and means for preventing the clogging of holes produced in the leading edge, and an aircraft comprising at least one such wing.

An aircraft wing comprises a leading edge which is the front part of the aerodynamic profile forming the wing. To ensure a laminar flow along the leading edge, it is known practice to pierce the leading edge with a multitude of holes, conventionally of 60 µm diameter, in a sheet approximately 0.4 to 0.6 millimeters thick, in order to suck the outside air from the interior of the wing through these holes or to expel the air from the interior of the wing to the outside.

Since this leading edge is also often subject to the deposition of organic residues, these holes can be blocked by these residues and can no longer correctly fulfil their function and the flow of the air is consequently no longer laminar but turbulent.

SUMMARY OF THE INVENTION

One object of the present invention is to propose a wing comprising a leading edge which is pierced with a multitude of holes and equipped with means making it possible to eliminate the organic deposits which are lodged in the holes.

To this end, a wing of an aircraft is proposed, the wing comprising:
  a leading edge forming a caisson delimited by a wall and an electrically conductive skin forming a lower surface and an upper surface of the wing and pierced with holes, in which the wall links an inner face of the lower surface to an inner face of the upper surface,
  a pump provided to suck the air present in the caisson and/or to inject air into the caisson,
  the wing being characterized in that each hole is equipped with an anti-clogging system which comprises:
  an electrode produced in an electrically conductive material,
  a body produced in an electrically insulating material and having a stem which lodges in the hole and which has a central orifice in which the electrode lodges, where the outer face of the stem has at least one tooth, where the at least one tooth protrudes from the outer face of the stem and extends over the height of the stem, where the at least one tooth is distributed around the stem so as to create at least one channel, and
  a voltage generator connected between the electrode and the skin.

Such an installation makes it possible to eliminate the residues which are lodged in the holes.

Advantageously, for each stem, one end of the stem is flush with the outer face of the skin.

Advantageously, the body has a shoe which is integral to the other end of the stem and which comes to bear against the inner face of the skin, and each channel is extended into the shoe to pass through it.

According to a particular embodiment, the end of the stem which is flush with the outer face of the skin is open-ended.

According to a particular embodiment, the end of the stem which is flush with the outer face of the skin is blind.

Advantageously, the electrode comprises a base which comes to bear against the body when an end of the electrode is introduced into the central orifice.

Advantageously, the skin comprises an insert which is electrically conductive, and which comprises a skirt which covers the inner wall of the hole and a flange integral to the skirt which covers the inner face of the skin and to which the voltage generator is electrically connected.

The invention also proposes an aircraft comprising at least one wing according to one of the preceding variants.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
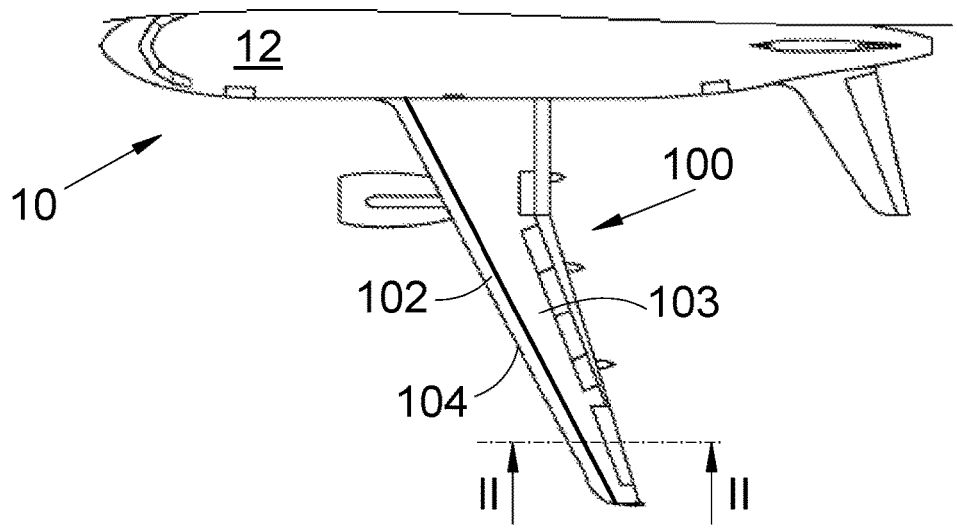
FIG. 1 shows a plan view of an aircraft according to the invention.

FIG. 1 shows an aircraft 10 which has a fuselage 12 on either side of which is fixed a wing 100 which has a main part 103 and a leading edge 102 which extends above and below the wing 100 at the front of the main part 103. The reference 104 shows a leading edge line which is the line of separation between the lower surface and the upper surface of the leading edge 102.

Figure 2:
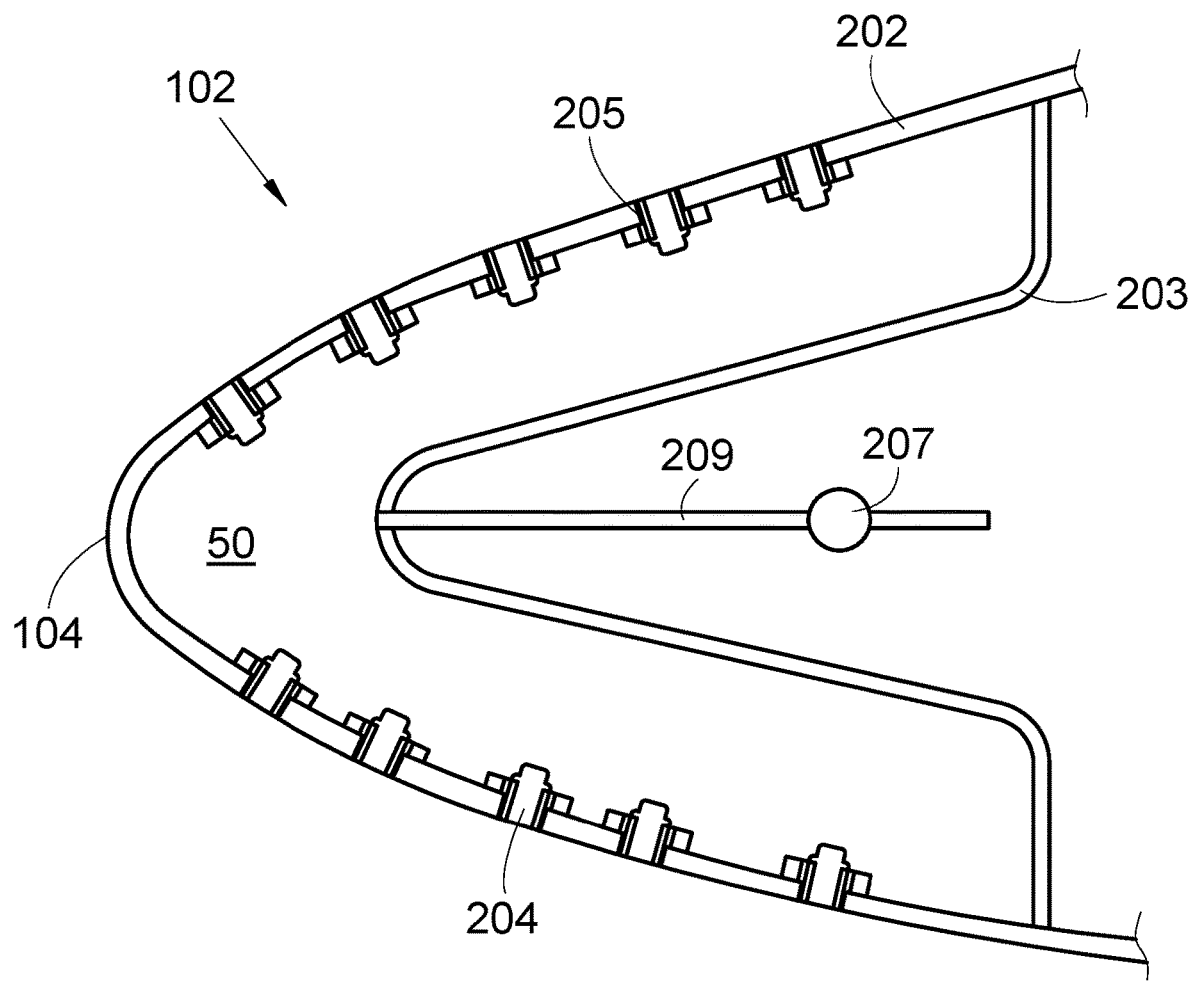
FIG. 2 shows a side view in cross section along the line II-II of a leading edge of a wing of FIG. 1.

FIG. 2 shows the leading edge 102 in cross section. The leading edge 102 takes the form of a caisson 50 which is delimited by a skin 202 and a wall 203. The skin 202 constitutes a lower surface and an upper surface of the wing 100, that is to say that it takes the form of a U open towards the rear of the aircraft 10. The skin 202 comprises an outer face over which the air flows and an inner face oriented towards the interior of the leading edge 102, and the wall 203 links the inner face of the lower surface to the inner face of the upper surface.

The skin 202 is pierced with a multitude of holes 205 which ensures the passage of the outside air to the interior of the caisson 50 and vice versa.

In order to ensure a suction of the air from the outside through the holes 205 or an expulsion of the air to the outside through the holes 205, the wing 100 is equipped with a pump 207 which is provided to suck out the air present in the caisson 50 and/or to inject air into the caisson 50. Here, the pump 207 is linked to the interior of the caisson 50 by a pipeline 209.

Each hole 205 is equipped with an anti-clogging system 204.

Figures 3, 5A, 5B, 6A, 6B:
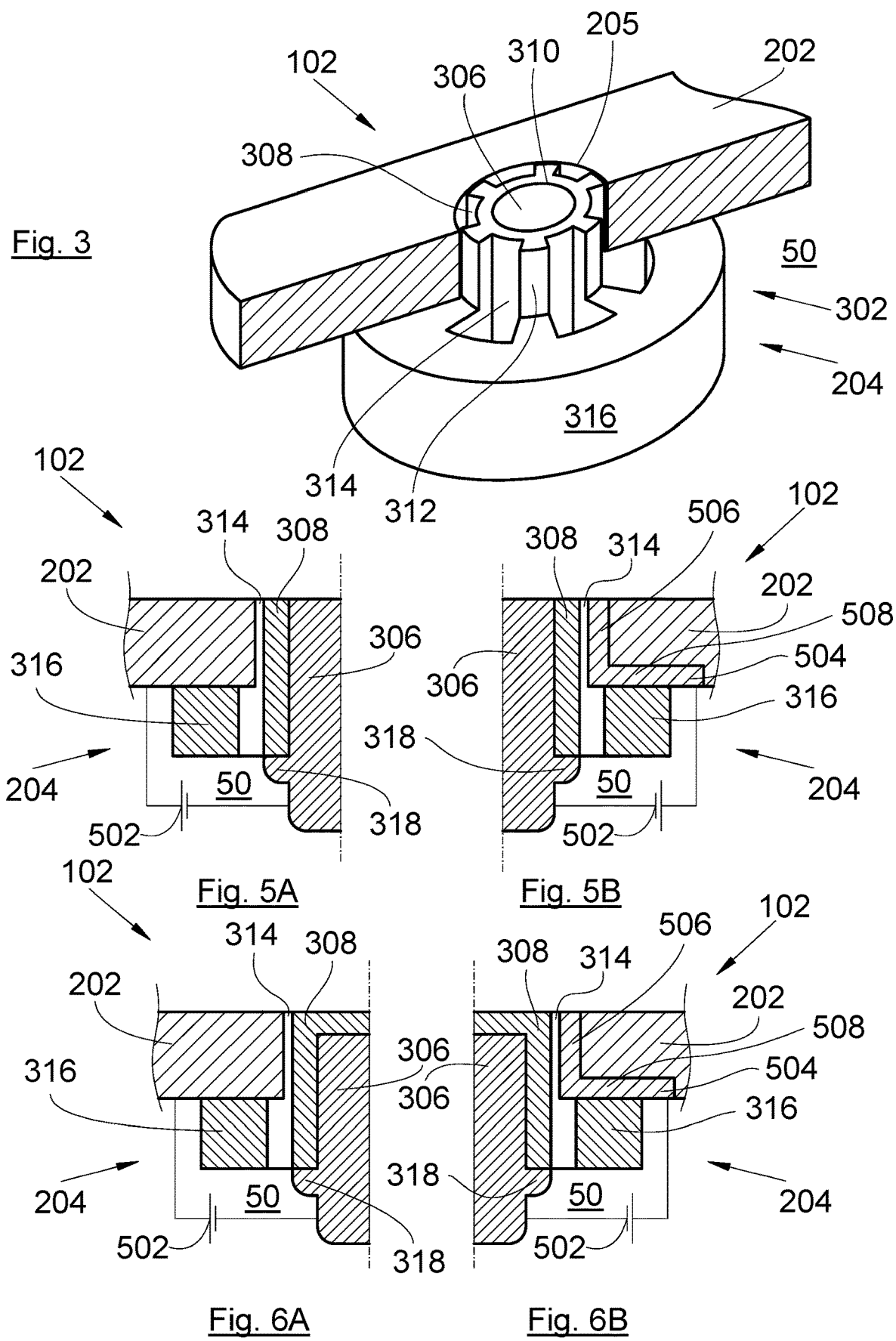
FIG. 3 shows a perspective view of a part of the leading edge of a wing according to a first embodiment of the invention.
FIG. 5A shows a cross-sectional view of the leading edge according to the first embodiment of the invention.
FIG. 5B shows a cross-sectional view of a leading edge according to a variant of the invention.
FIG. 6A shows a cross-sectional view of a leading edge according to another variant of the invention.
FIG. 6B shows a cross-sectional view of a leading edge according to another variant of the invention.
Figure 4:
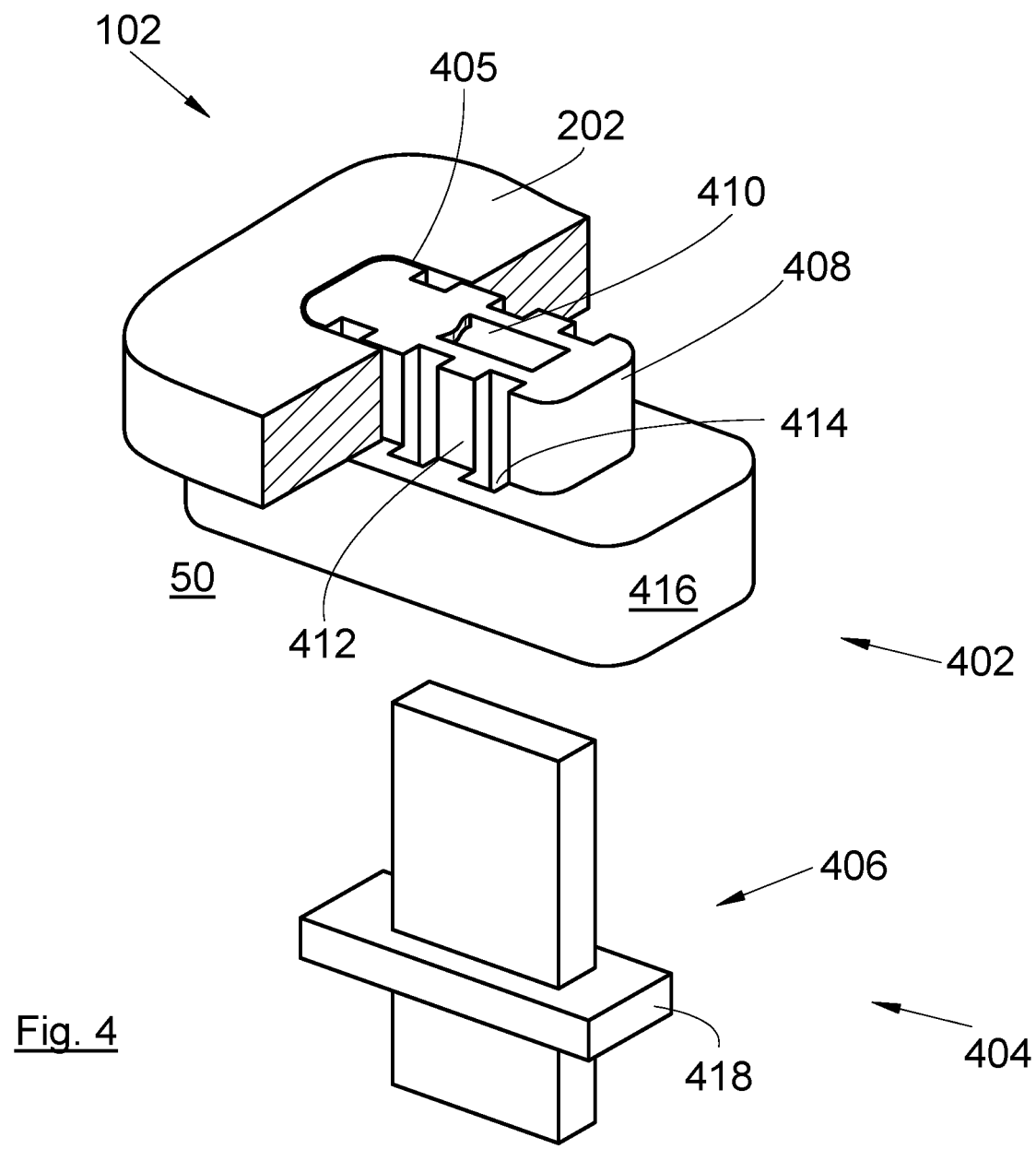
FIG. 4 shows a perspective view of a part of the leading edge of a wing according to a second embodiment of the invention.

FIG. 3 shows an anti-clogging system 204 according to a first embodiment of the invention and FIG. 4 shows an anti-clogging system 404 according to a second embodiment of the invention.

In the first embodiment of FIG. 3, the hole 205 is circular and in the embodiment of FIG. 4, the hole 405 is rectangular. Obviously, it is possible to have holes of different form.

The anti-clogging system 204, 404 comprises a body 302, 402 produced in an electrically insulating material such as, for example, of ceramic, and an electrode 306, 406 produced in an electrically conductive material.

The body 302, 402 has a stem 308, 408 which has a form which allows it to be introduced into the hole 205, 405. In the embodiment of FIG. 3, the stem 308 is cylindrical and in the embodiment of FIG. 4, the stem 408 is rectangular.

The axis of the stem 308, 408 is parallel to the axis of the hole 205, 405 into which it is introduced. The stem 308, 408 constitutes a dielectric.

The fixing of the body, 302, 402 is ensured by any appropriate means, such as, for example, bonding or flange-fixing. The height of the stem 308, 408 is at least equal to the depth of the hole 205, 405 so as to place one end of the stem 308, 408 flush with the outer face of the skin 202. As a variant, the end of the stem can be placed set back by a few millimeters from the outer face of the skin 202, or extend beyond by the order of ten or so microns.

The stem 308, 408 has a central orifice 310, 410 in which the electrode 306, 406 lodges. In the embodiment of FIG. 3, the central orifice 310 is cylindrical and in the embodiment of FIG. 4, the central orifice 410 is rectangular.

Likewise, the electrode 306, 406 has a form which allows it to be lodged in the central orifice 310, 410, that is to say, here, cylindrical for the embodiment of FIG. 3 and rectangular for the embodiment of FIG. 4.

The axis of the orifice 310, 410 is parallel to the axis of the hole 205, 405 and is therefore overall at right angles to the skin 202.

The outer face of the stem 308, 408 has at least one tooth 312, 412, where the at least one tooth 312, 412 protrudes from the outer face of the stem 308, 408 and extends over the height of stem 308, 408 parallel to the axis of the stem 308, 408. The at least one tooth 312, 412 is distributed around the stem 308, 408 so as to create at least one channel 314, 414 which extends parallel to the axis of the stem 308, 408 and which allow the passage of the air between the outside of the skin 202 and the caisson 50 or vice versa. The at least one channel 314, 414 has a depth at right angles to the axis of the hole 205, 405, which is gauged according to the suction or blowing requirement, according to a particular embodiment, the depth is of the order of 60 µm. The at least one channel 314, 414 emerges at one of these ends, on the side of the outer face of the skin 202, and at the other of these ends, in the caisson 50.

In the case where there are several teeth 312, 412, each channel 314, 414 extends between two successive teeth 312, 412.

The outer dimensions of the teeth 312, 412 are designed for the outer faces of the teeth 312, 412 to come against the inner wall of the hole 205 in order to correctly position the stem 308, 408 in the hole 205, 405.

For each electrode 306, 406, the wing 100 also comprises a voltage generator (502 FIGS. 5A-B and 6A-B) connected between the electrode 306, 406 and the skin 202 which is electrically conductive. The voltage generator is driven by a control unit of the aircraft 10.

When the voltage generator is activated, it makes it possible to apply a potential difference between the electrode 306, 406 and the skin 202. When the potential difference is sufficient, a plasma is created between the electrode 306, 406 and the skin 202 and this plasma is propagated through the channels 314, 414 which makes it possible to eliminate residues which would be caught in the channels 314, 414, whether these residues are organic or ice.

To facilitate the alignment of an end of the stem 308, 408 with the outer face of the skin 202, the body 302, 402 has a shoe 316, 416 which is integral to the other end of the stem 308, 408 and which comes to bear against the inner face of the skin 202 when the body 302, 402 is put in place. The dimensions of the shoe 316, 416 are such that it is prevented from passing through the hole 205, 405.

Each channel 314, 414 is extended inside the shoe 316, 416 to pass through it and emerge in the caisson 50.

Likewise, to ensure the positioning of the electrode 306, 406 relative to the central orifice 310, 410, when an end of the electrode 306, 406 is introduced into the central orifice 310, 410, the electrode 306, 406 comprises a base 318, 418 which is integral to the other end of the electrode 306, 406 and which comes to bear against the body 302, 402. The dimensions of the base 318, 418 are such that it is prevented from passing through the central orifice 310, 410.

The variants of FIGS. 5A-B and 6A-B are more particularly described on the basis of the first embodiment of the invention, but they can be applied likewise to the second embodiment.

FIG. 5A is the representation of the embodiment of FIG. 1, where the voltage generator 502 is connected between the electrode 306 and the skin 202.

FIG. 5B is a variant which corresponds to the case where the skin 202 is made electrically conductive by the fitting of an insert 504 which is electrically conductive. The insert 504 comprises a skirt 506, here hollow cylindrical, which covers the inner wall of the hole 205 and a flange 508 integral to the skirt 506, here in the form of a disc, which covers the inner face of the skin 202. The voltage generator 502 is electrically connected between the electrode 306 and the insert 504, more particularly the flange 508. In this embodiment, the outer dimensions of the teeth 312, 412 are designed for the outer faces of the teeth 312, 412 to come against the inner wall of the skirt 506.

In the embodiments of FIGS. 3, 5A-B, the end of the stem 308 which is flush with the outer face of the skin 202 is open-ended, revealing the electrode 306, which also allows for the creation of a plasma between the electrode 306 and the outer face of the skin 202 to eliminate any residues that are present.

In the right hand part of FIG. 4, the end of the stem 408 is also open-ended.

In these cases, the electrode 306, 406 is also preferably flush with the outer surface of the skin 202.

In the embodiments of FIGS. 6A-B, the end of the stem 308 which is flush with the outer face of the skin 202 is blind, not revealing the electrode 306.

In the left hand part of FIG. 4, the end of the stem 408 is also blind.

FIG. 6A corresponds to the case where the skin 202 is electrically conductive and FIG. 6B corresponds to the case where the skin 202 is made electrically conductive by the fitting of the insert 504. In this latter embodiment also, the outer dimensions of the teeth 312, 412 are designed for the outer faces of the teeth 312, 412 to come against the inner wall of the skirt 506 of the insert 504.

It is possible to provide for one and the same voltage generator 502 to power several electrodes 306, 406.

Although the invention has been described more particularly in the case of a wing, it applies equally to all the parts of an aircraft having a leading edge, such as, for example, a vertical stabilizer, a stabilizer, an air intake of an engine or an engine nacelle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing of an aircraft, said wing comprising:
a leading edge forming a caisson delimited by a wall and an electrically conductive skin forming a lower surface and an upper surface of the wing and pierced with holes, in which the wall links an inner face of the lower surface to an inner face of the upper surface,
a pump configured to at least one of suck any air present in the caisson or to inject air into the caisson,
each of the pierced holes being equipped with an anti-clogging system which comprises:
an electrode produced in an electrically conductive material,
a body produced in an electrically insulating material and having a stem which lodges in the hole and which has a central orifice in which the electrode lodges, where an outer face of the stem has at least one tooth, where the at least one tooth protrudes from the outer face of the stem and extends over a height of the stem, where the at least one tooth is distributed around the stem so as to create at least one channel, and
a voltage generator connected between the electrode and the skin.

2. The wing according to claim 1, wherein, for each stem, one end of the stem is flush with the outer face of the skin.

3. The wing according to claim 2, wherein the body has a shoe which is integral to an other end of the stem and which comes to bear against the inner face of the skin, and in that each channel is extended into the shoe to pass through it.

4. The wing according to claim 2, wherein the end of the stem which is flush with the outer face of the skin is open-ended.

5. The wing according to claim 2, wherein the end of the stem which is flush with the outer face of the skin is blind.

6. The wing according to claim 1, wherein the electrode comprises a base which comes to bear against the body when an end of the electrode is introduced into the central orifice.

7. The wing according to claim 1, wherein the skin comprises an insert which is electrically conductive, and which comprises a skirt which covers the inner wall of the hole and a flange integral to the skirt which covers the inner face of the skin and to which the voltage generator is electrically connected.

8. An aircraft comprising at least one wing according to claim 1.

* * * * *